United States Patent
Singh et al.

(10) Patent No.: US 8,645,019 B2
(45) Date of Patent: Feb. 4, 2014

(54) GRAPH MATCHING SYSTEM FOR COMPARING AND MERGING FAULT MODELS

(75) Inventors: Satnam Singh, Bangalore (IN); Steven W. Holland, Saint Clair, MI (US); Pulak Bandyopadhyay, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 338 days.

(21) Appl. No.: 12/964,230

(22) Filed: Dec. 9, 2010

(65) Prior Publication Data

US 2012/0151290 A1 Jun. 14, 2012

(51) Int. Cl.
*G01M 17/00* (2006.01)
*G10L 13/00* (2006.01)
*G06G 7/48* (2006.01)

(52) U.S. Cl.
USPC ............. 701/30.2; 704/262; 701/31.6; 703/6; 703/8

(58) Field of Classification Search
USPC ................ 704/26; 701/29.9, 30.1, 30.2, 31.6, 701/31.7; 703/2, 16, 20, 27, 46
See application file for complete search history.

(56) References Cited

U.S. PATENT DOCUMENTS

| | | | |
|---|---|---|---|
| 6,208,955 B1 * | 3/2001 | Provan et al. | 703/20 |
| 6,768,935 B1 * | 7/2004 | Morgan et al. | 701/29.6 |
| 7,409,676 B2 * | 8/2008 | Agarwal et al. | 717/120 |
| 8,051,330 B2 * | 11/2011 | Cinato et al. | 714/26 |
| 2007/0233728 A1 * | 10/2007 | Puteick et al. | 707/103 R |
| 2008/0119981 A1 * | 5/2008 | Chen | 701/33 |
| 2009/0094076 A1 * | 4/2009 | Reddy | 705/7 |
| 2009/0299713 A1 * | 12/2009 | Miller et al. | 703/8 |
| 2010/0192013 A1 | 7/2010 | Krishnan | |

OTHER PUBLICATIONS

"Classification Methods Based on Bipartite Graph" by Heng-Nian QI and associates published IEEE Aug. 2005.*
"Vehicle System Dynamics: Internation journal of Vehicle Mechanics and mobility" by B.P. Jeppesen published Mar. 2009.*
Classification Methods Based on Bipartite Graph by: Heng-Nian Qi.*

* cited by examiner

*Primary Examiner* — Thomas Black
*Assistant Examiner* — Tyler Paige
(74) *Attorney, Agent, or Firm* — John A. Miller; Miller IP Group, PLC

(57) ABSTRACT

A method and system for comparing and merging fault models which are derived from different data sources. Two or more fault models are first represented as bipartite weighted graphs, which define correlations between failure modes and symptoms. The nodes of the graphs are compared to find failure modes and symptoms which are the same even though the specific terminology may be different. A graph matching method is then used to compare the graphs and determine which failure mode and symptom correlations are common between them. Finally, smoothing techniques and domain expert knowledge are used to merge and update the fault models, producing an integrated fault model which can be used by onboard vehicle systems, service facilities, and others.

20 Claims, 6 Drawing Sheets

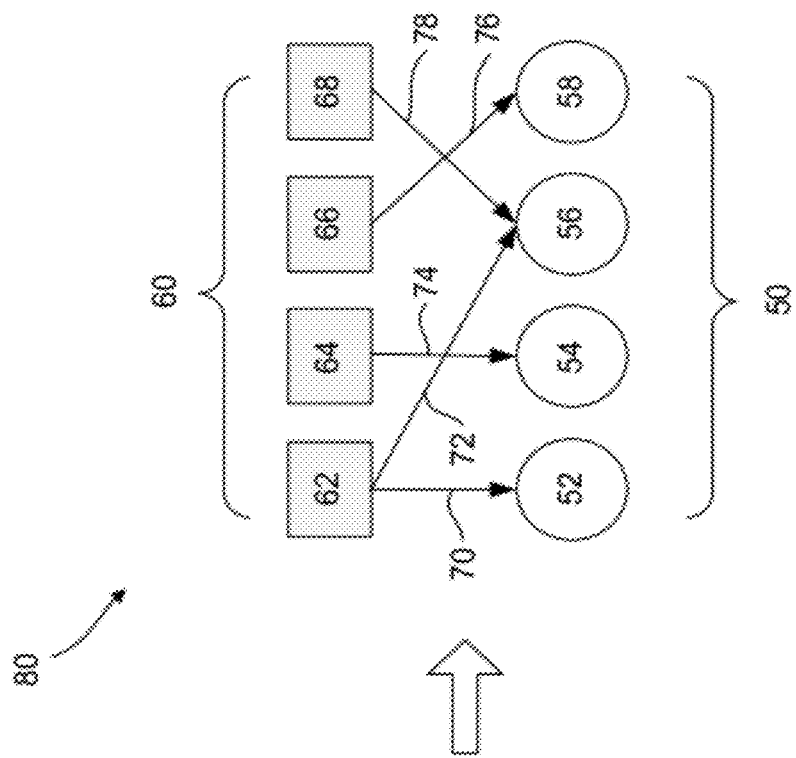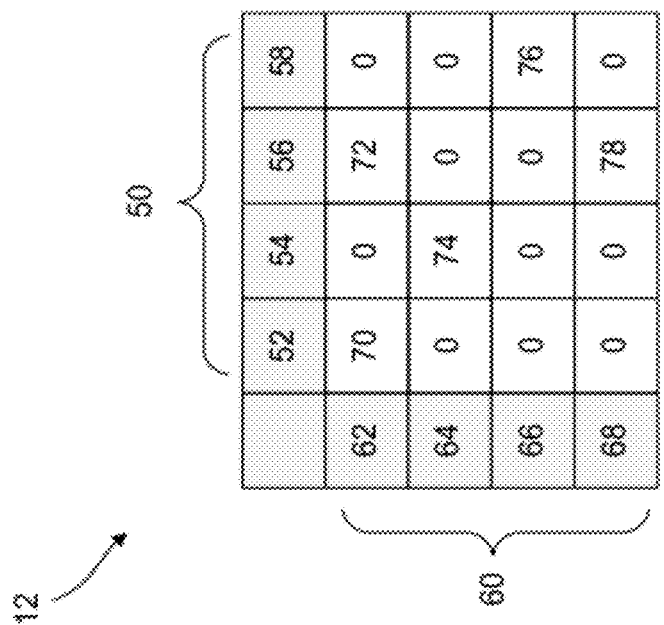
FIGURE 3

GRAPH MATCHING SYSTEM FOR COMPARING AND MERGING FAULT MODELS

BACKGROUND OF THE INVENTION

1. Field of the Invention

This invention relates generally to a method and system for comparing and merging fault models and, more particularly, to a method and system for comparing and merging fault models derived from different data sources which represents each fault model as a bipartite weighted graph, identifies common failure modes and symptoms between the graphs, compares fault models using a graph matching method, and produces a merged and updated fault model as output.

2. Discussion of the Related Art

Modern vehicles are complex electro-mechanical systems that employ many sub-systems, components, devices, and modules, which pass operating information between and among each other using sophisticated algorithms and data buses. As with anything, these types of devices and algorithms are susceptible to errors, failures and faults that can affect the operation of the vehicle. To help manage this complexity, vehicle manufacturers develop fault models, which match the various failure modes with the symptoms exhibited by the vehicle.

Vehicle manufacturers commonly develop fault models from a variety of different data sources. These data sources include engineering data, service procedure documents, text verbatim from customers and repair technicians, warranty data, and others. While all of these fault models show the correlations between failure modes and symptoms, there are enough differences between the fault models that it is difficult to compare and combine them directly. The differences include using different terminology to mean the same thing, extra items or missing items in one fault model or another, and even different correlations between a common failure mode and symptom pair. These differences have traditionally meant that the various fault models are used independently of one another, and are never compared in sufficient detail to determine where there may be synergies or inconsistencies between them. As a result, service procedure documents and onboard and off-board diagnostic tools may not take advantage of all known correlations between failure modes and symptoms.

There is a need for a method for comparing and merging fault models which are developed from different data sources. Such a method could not only create an integrated fault model for improved fault diagnosis by various downstream users of the model, but could also be used to enhance service procedures, detect inappropriate repairs at service shops, and improve diagnostic comparisons across vehicle platforms.

SUMMARY OF THE INVENTION

In accordance with the teachings of the present invention, a method and system are disclosed for comparing and merging fault models which were derived from different data sources. Two or more fault models are first represented as bipartite weighted graphs, which define correlations between failure modes and symptoms. The nodes of the graphs are compared to find failure modes and symptoms which are the same even though the specific terminology may be different. A graph matching method is then used to compare the graphs and determine which failure mode and symptom correlations are common between them. Finally, smoothing techniques and domain expert knowledge are used to merge and update the fault models, producing an integrated fault model which can be used by both off-board and onboard vehicle systems, service facilities, and others.

Additional features of the present invention will become apparent from the following description and appended claims, taken in conjunction with the accompanying drawings.

BRIEF DESCRIPTION OF THE DRAWINGS

FIG. 3 is a diagram showing how a fault model is converted to a bipartite weighted graph;

DETAILED DESCRIPTION OF THE EMBODIMENTS

The following discussion of the embodiments of the invention directed to a method and system for comparing and merging fault models is merely exemplary in nature, and is in no way intended to limit the invention or its applications or uses. For example, the present invention has particular application for vehicle fault diagnosis. However, the invention is equally applicable to fault diagnosis in other industries, such as aerospace and heavy equipment, and to fault diagnosis in any mechanical, electrical, or electro-mechanical system where fault models are used.

Fault models have long been used by manufacturers of vehicles and other systems to document and understand the correlation between failure modes and associated symptoms. Because fault models can be derived from a variety of data sources, it has traditionally been difficult or impossible to compare different fault models for the same vehicle or system, and gain the benefit of all of the data contained in all of the fault models. The present invention provides a solution to this problem, by proposing a method and system for comparing and merging fault models.

Figure 1:
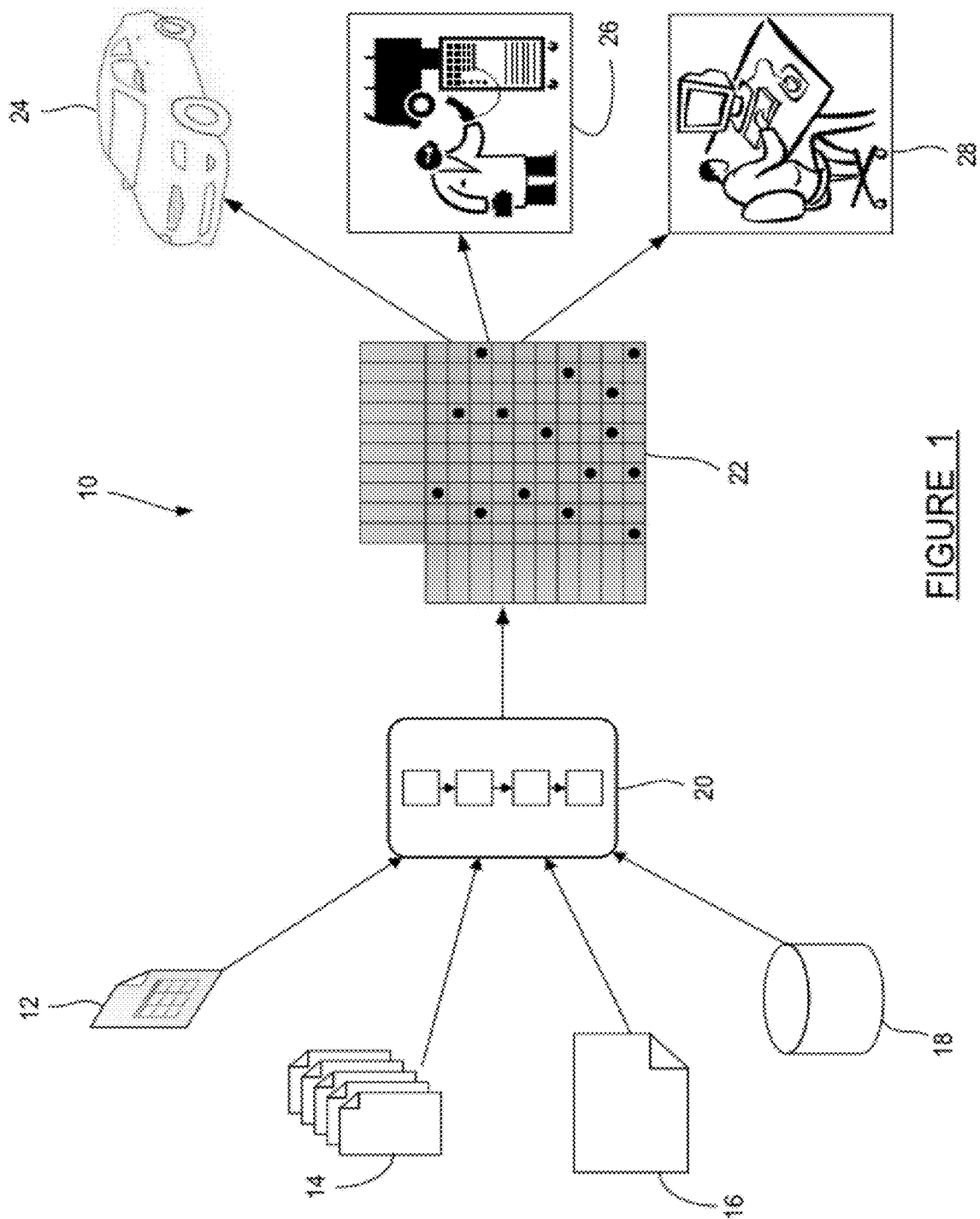
FIG. 1 is a schematic diagram of a system which takes fault models from several sources, compares and merges them, and uses the resultant integrated fault model in both onboard and off-board systems.

FIG. 1 is a schematic diagram of a system 10 which takes fault models derived from different sources, compares and merges them, and uses the resultant integrated fault model for various purposes, both onboard a vehicle and off-board. The system 10 can use fault models derived from a variety of data sources, as long as all of the fault models describe the same vehicle design or platform. Alternatively, two fault models using the same type of data source, but describing different vehicle models, may be compared. Types of fault models which can be used include an engineering data fault model 12, a service document fault model 14, a text verbatim fault model 16, and a warranty data fault model 18. Other types of fault models may also be used, but discussion of the fault models 12-18 will be sufficient to explain the concept.

The engineering data fault model 12 can be derived using many different types of engineering data, including analysis and simulation data, Failure Modes, Effects, and Criticality Analysis (FMECA) documents, and others. The service document fault model 14 is derived principally from service procedure documents which are typically available for any vehicle design, where the service procedure documents contain a wealth of information about what tests to run, repairs to make, or parts to replace for any given vehicle symptom. The text verbatim fault model 16 is derived from textual descriptions provided by customers or service technicians, describing what symptom the vehicle was exhibiting and what was done to address it. And the warranty data fault model 18 is derived from warranty data, which may include Diagnostic Trouble Codes (DTCs), operating parameters, or other forms of test results captured by the vehicle computer, along with information about what component was repaired or replaced to address each DTC.

A simplistic representation of each of the fault models 12-18 is a two dimensional matrix that contains failure modes as rows, symptoms as columns, and a correlation value in the intersection of each row and column. Part identification data is typically contained in the failure modes. The correlation value contained in the intersection of a row and a column is commonly known as a causality weight. In the simplest case, the causality weights all have a value of either zero or one, where a zero indicates no correlation between a particular failure mode and a particular symptom, and a one indicates a direct correlation between a particular failure mode and a particular symptom. However, causality weight values between zero and one can also be used, and indicate the level of strength of the correlation between a particular failure mode and a particular symptom. Where more than one failure mode is associated with a particular symptom or set of symptoms, this is known as an ambiguity group.

In a more complete form, the fault models 12-18 could include additional matrix dimensions containing information such as signals and actions, as they relate to the failure modes and symptoms. For clarity, however, the integrated fault model development methodology will be described in terms of the two primary matrix dimensions, namely failure modes and symptoms.

An integration module 20 receives the fault models 12-18, and performs several comparison, merging, and updating steps, described below, to produce an integrated fault model 22. The integrated fault model 22 contains a fully vetted representation of the data from the fault models 12-18, not just a simple union or intersection. This will be discussed in detail below. As a printable document, the integrated fault model 22 can read by people working on design or service of a vehicle. As a relational data model, the integrated fault model 22 can be loaded into a processor onboard a vehicle 24 for real-time system monitoring, used in a diagnostic tool 26 at a service facility, or used by vehicle development personnel 28 for creation of improved service procedure documents and new vehicle and system designs.

Figure 2:
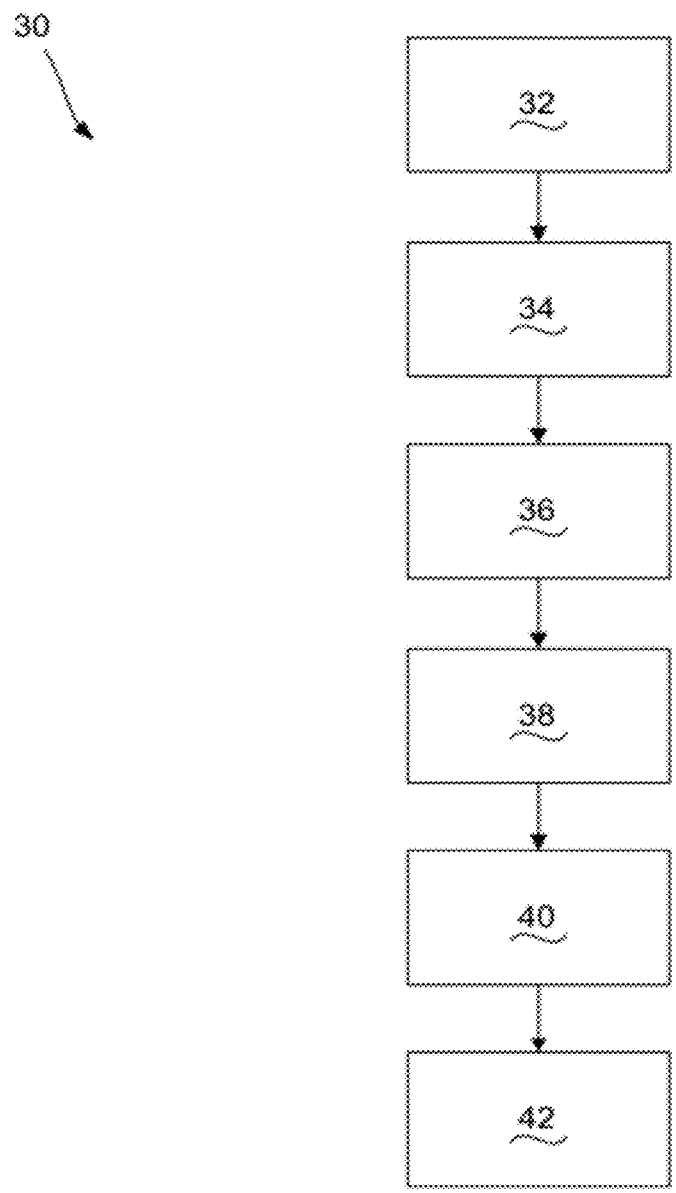
FIG. 2 is a flow chart diagram of a method that can be used to compare and merge fault models from different sources.

FIG. 2 is a flow chart diagram 30 of a method that can be used in the integration module 20 to compare and merge fault models from different data sources. At box 32, two or more fault models are provided for integration. The fault models provided at the box 32 can include two or more of the fault models 12-18. The fault models 12-18 provided at the box 32 need not include exactly the same failure modes or symptoms in their rows and columns. Throughout the remainder of the discussion of the flow chart diagram 30, the engineering data fault model 12 and the service document fault model 14 will be used as examples. At box 34, each of the fault models 12 and 14 is represented as a bipartite weighted graph. Note that for the rest of this document, when symptoms are mentioned, this could include literally just symptoms, or could also include the presence of diagnostic trouble codes or the results of various diagnostic tests or customer complaints or, in general, any evidence that relates to the given failure mode.

FIG. 3 is a diagram showing how the engineering data fault model 12 is represented as a bipartite weighted graph 80. The same approach applies to the service document fault model 14, and any other fault models used. A simplified example of the engineering data fault model 12, containing four rows and four columns, is shown in FIG. 3. The fault model 12 includes symptoms 50 in columns 52, 54, 56, and 58, where the symptoms 50 come from the engineering data. For example, if a FMECA document is used as a data source, the effects from the FMECA document would normally serve as the symptoms 50 in the fault model 12. The symptoms 50 might include items such as "engine won't start", or "low fuel light illuminates". The fault model 12 also includes failure modes 60 in rows 62, 64, 66, and 68, where the failure modes 60 also come from the engineering data. Failure modes from the FMECA document naturally serve as the failure modes 60 in the fault model 12. A failure mode is an indication of what is actually wrong with a component or system, such as, "fuel tank pressure sensor signal line is shorted to ground".

The fault model 12 contains causality weights 70, 72, 74, 76, and 78, where each of the causality weights 70-78 resides in an intersection of a failure mode row and a symptom column. As mentioned previously, each of the causality weights 70-78 is a value between zero and one, designating the degree of correlation between a particular failure mode and a particular symptom. For example, the causality weights 70, 74, and 76 could have values of 1.0, the causality weight 72 could have a value of 0.3, and the causality weight 78 could have a value of 0.8. All of the other intersections in the fault model 12, not populated by one of the causality weights 70-78, have a causality weight of zero, meaning no correlation.

The bipartite weighted graph 80 represents the data from the fault model 12 in a different way. The bipartite weighted graph 80 displays the symptoms 50 as circles along the bottom, and the failure modes 60 as boxes along the top. The causality weights 70-78 are represented as arrows from each of the failure modes 60 to each of the symptoms 50. Arrows are omitted for causality weight values of zero, which are all of the row-column intersections except for the ones designated by the causality weights 70-78. The service document fault model 14 can be represented in a bipartite weighted graph in the same way as described above.

Figure 5:
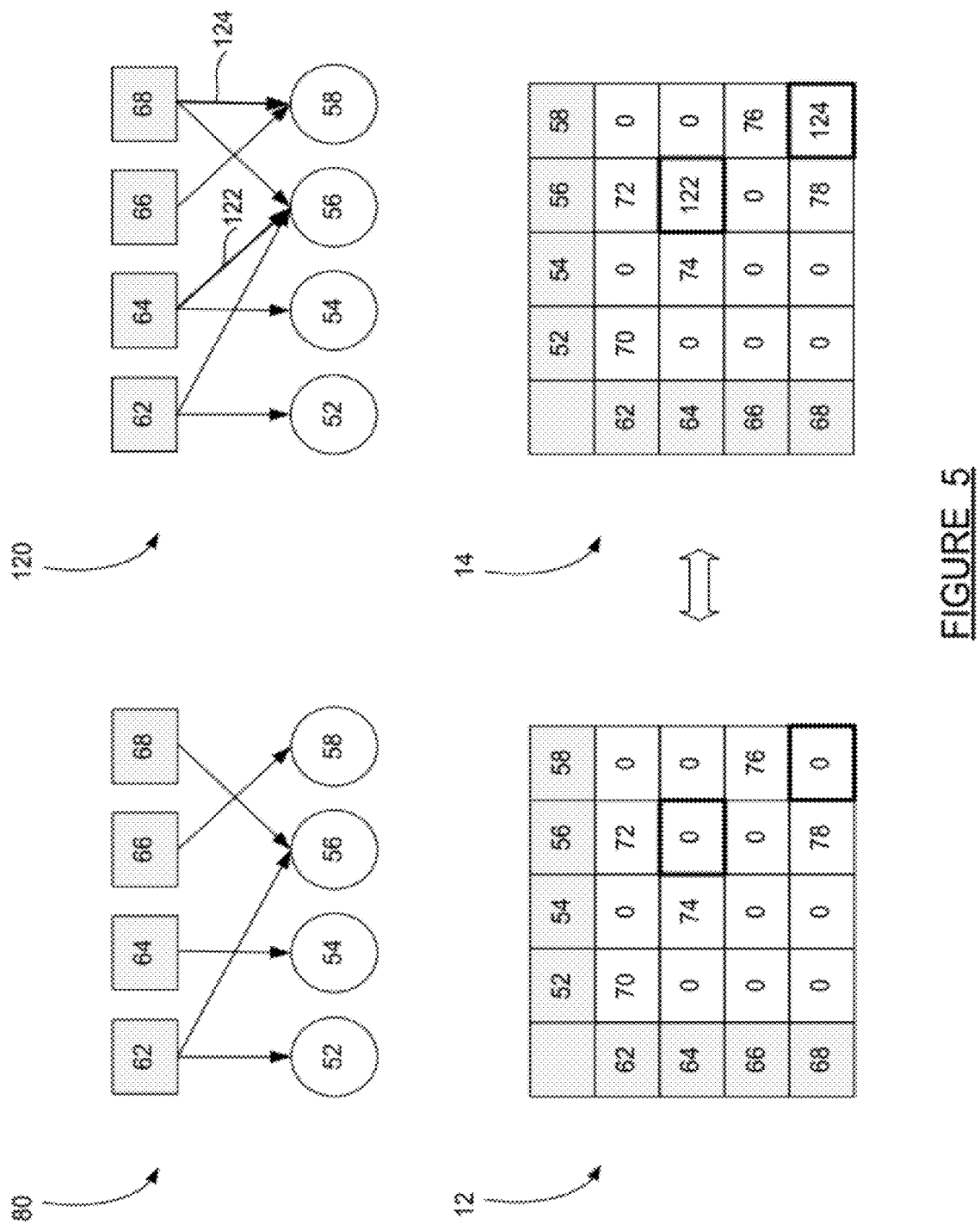
FIG. 5 is a diagram showing how graph matching is used to compare fault models.

Returning to the flow chart diagram 30, the next step, at box 36, is to match the nodes of the bipartite weighted graph 80 with the nodes of a bipartite weighted graph 120 created from the fault model 14 (shown on FIG. 5). The nodes of the bipartite weighted graph 80 are the symptoms 50 and the failure modes 60. By matching the nodes in the bipartite weighted graph 80 with the nodes in the bipartite weighted graph 120, the complexity of subsequent steps can be greatly reduced. The graph node matching at the box 36 uses various text similarity techniques to identify which nodes are really the same even though they are described using different words, as explained in the following discussion.

Figure 4:
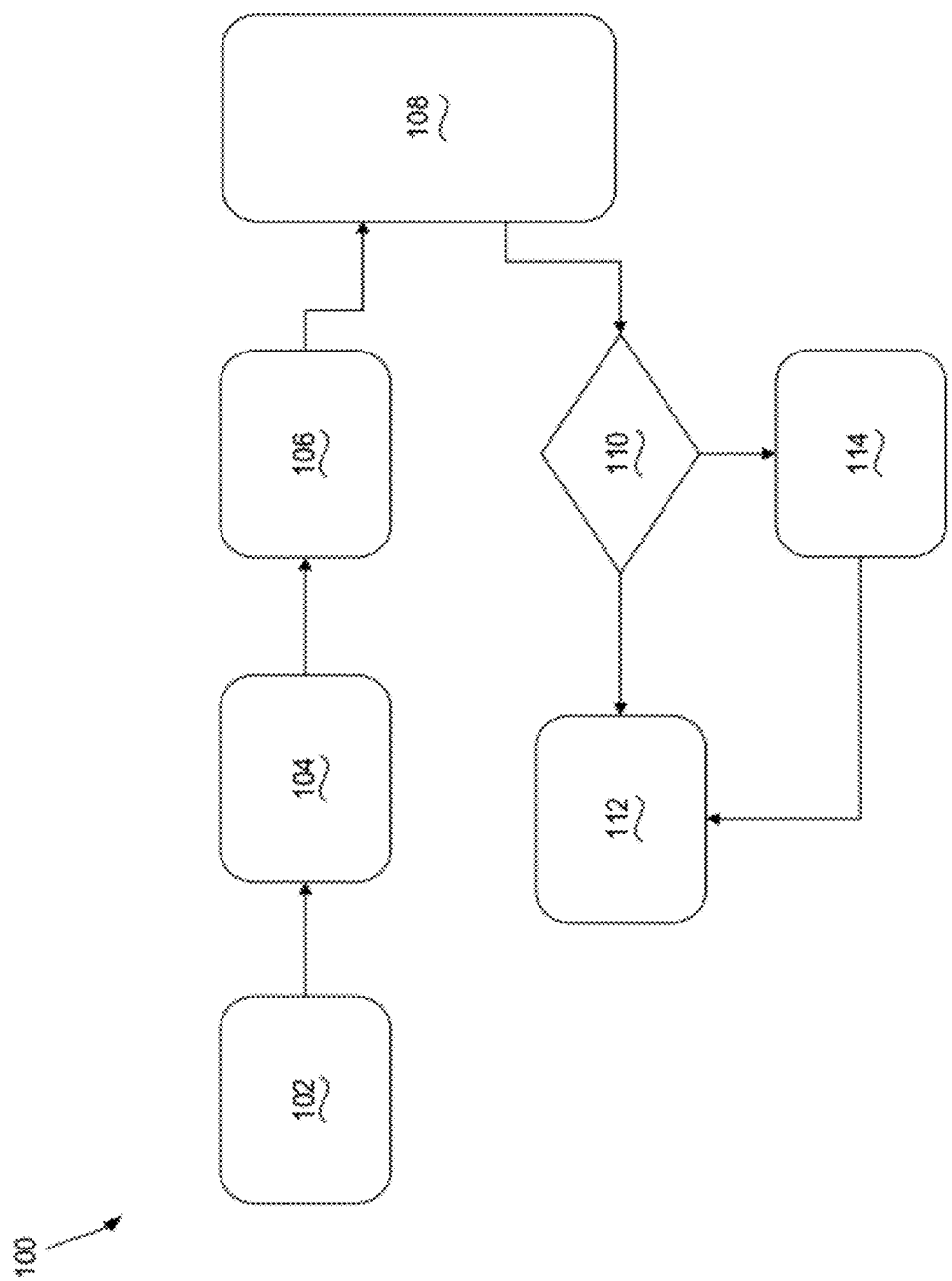
FIG. 4 is a flow chart diagram of a method for identifying common failure modes and symptoms between graphs.

FIG. 4 is a flow chart diagram 100 of a method for identifying common failure modes and symptoms between the bipartite weighted graph 80 and the bipartite weighted graph 120. At box 102, text strings for each of the failure modes 60 from the bipartite weighted graph 80 are provided, along with text strings for each of the failure modes from the bipartite weighted graph 120. At box 104, unnecessary or superfluous words are removed, such as the articles "a", "an", and "the". At box 106, a domain-specific thesaurus is used to resolve synonyms, abbreviations, and acronyms. Most manufacturers maintain reference documents which provide the definitions of abbreviations and acronyms, and may also be used to provide context-specific synonyms.

At box 108, various text similarity measures can be employed to provide a text similarity score for each pair of text strings. The measures can include lexical similarity, probabilistic similarity, and hybrid lexical/probabilistic approaches. These text similarity measures are known in the art, and need not be discussed in detail here. Various algorithms exist which are based on these text similarity measures, each of which provides a similarity score for each pair of text strings. In this way, a similarity score can be computed between the failure mode 62 from the bipartite weighted graph 80 and the first failure mode from the bipartite weighted graph 120. Likewise, the failure mode 62 from the bipartite weighted graph 80 can be compared to the second failure mode from the bipartite weighted graph 120 to compute a similarity score, and so forth.

At decision diamond 110, the similarity score for each pair of text strings can be compared to a threshold value to determine if the two text strings can be considered a match. If the similarity score for any pair of text strings meets or exceeds the threshold value, then the two text strings are determined to be the same at box 112, and this determination is used in subsequent analysis of the graphs 80 and 120. If the similarity score for any pair of text strings is lower than the threshold value, then the two text strings can be reviewed by a subject matter expert at box 114 to determine if they should be considered the same or different. Text string pairs with a very low similarity score can be automatically determined to be different, while text string pairs with similarity scores near but below the threshold can be reviewed by the subject matter expert. The subject matter expert designates each text string pair as the same or different at the box 114 and this determination is used at the box 112 in subsequent analysis of the graphs 80 and 120.

The symptoms 50 from the bipartite weighted graph 80 can likewise be compared to the symptoms from the bipartite weighted graph 120, using the text similarity measures just described. As a result of the node matching process employed at the box 36, the common nodes between the bipartite weighted graphs 80 and 120 will be identified.

Returning to the flow chart diagram 30, the process continues at box 38. FIG. 5 is a diagram showing how a graph matching technique is used at the box 38 to compare the fault models 12 and 14 via the bipartite weighted graphs 80 and 120. The goal of the graph matching technique at the box 38 is to obtain a common sub-graph from the bipartite weighted graphs 80 and 120. By performing the node matching process of the box 36 in a prior step, the complexity of the graph matching technique at the box 38 is reduced from an exponential function of the number of nodes to a polynomial function of the number of nodes. This reduction of complexity makes the graph matching technique at the box 38 practical, even for large fault models.

As discussed above, the fault model 12 is represented by the bipartite weighted graph 80, and the fault model 14 is represented by the bipartite weighted graph 120. For the sake of clarity in this discussion, it is assumed that after completing the node matching process at the box 36, the nodes of the graph 80 have been determined to be the same as the nodes of the graph 120. That is, both the graph 80 and the graph 120 have the symptoms 52-58 and the failure modes 62-68. However, the correlations are not identically the same. It can be seen in FIG. 5 that the graph 120 contains two additional arrows which do not appear in the graph 80. These two additional arrows represent causality weights 122 and 124, which can be seen in the fault model 14, while zeros appear in the corresponding boxes of the fault model 12. The common sub-graph is defined as including only the correlations which are the same in both the graph 80 and the graph 120. Thus, in this case, the causality weights 122 and 124 are not common, and the common sub-graph between the graphs 80 and 120 is the same as the graph 80 itself.

It is also possible that, instead of a zero value and a non-zero value in a common intersection of the graphs 80 and 120 as discussed above, two different non-zero values may appear in a common intersection. In that case, the common sub-graph contains a causality weight value which is updated using parameter smoothing techniques and domain knowledge, which are discussed below.

Figure 6:
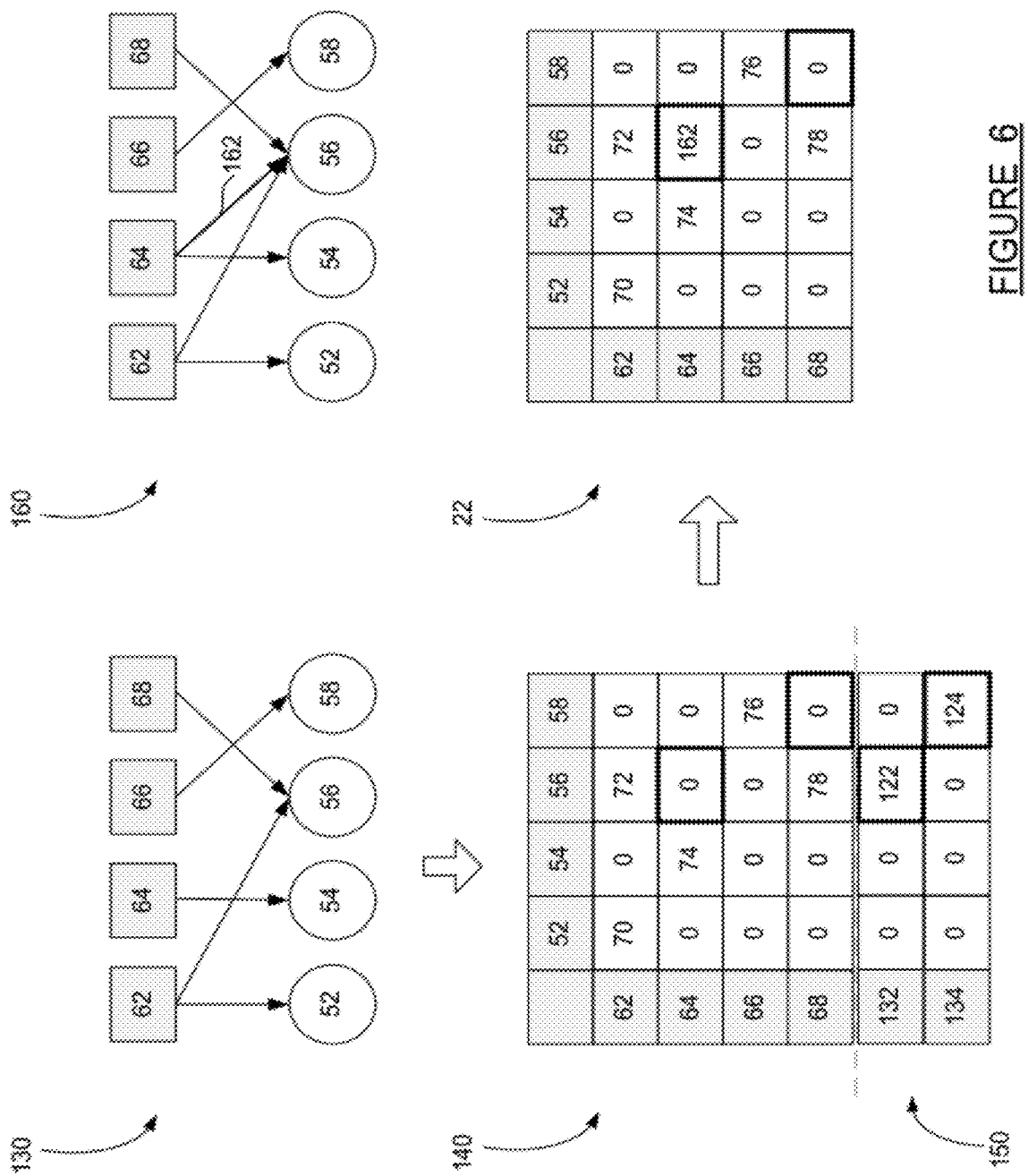
FIG. 6 is a diagram showing how a merged and updated fault model is produced.

After the common sub-graph and common fault model are obtained at the box 38, parameter smoothing techniques and domain knowledge are applied at box 40 to merge and update the fault models 12 and 14. FIG. 6 is a diagram showing how a merged and updated fault model is produced. A common sub-graph 130 was produced at the box 38. As discussed above in connection with FIG. 5, the common sub-graph 130 appears the same as the bipartite weighted graph 80 for the fault model 12. A common fault model 140 reflects the content of the common sub-graph 130. An uncommon section 150 includes any items which were not determined to be common in the graph matching technique carried out at the box 38. New rows are added for failure modes 132 and 134, which are the same as the failure modes 64 and 68, respectively. The uncommon causality weights 122 and 124 are then placed in the uncommon section 150 in the appropriate intersection of a failure mode and a symptom, as they originally appeared in their parent fault model.

To produce the integrated fault model 22 from the common fault model 140 and the uncommon section 150, parameter smoothing techniques are first applied at the box 40. Laplacian smoothing and Bayesian smoothing are two techniques that can be used to modify the causality weights 122 and 124 which reside in the uncommon section 150. These smoothing techniques are typically used to reduce variation in data sets, for example, to bring outlying data points closer to the mean. In the case of the uncommon section 150, the included causality weights 122 and 124 can be modified based on their frequency of appearance relative to the number of fault models which are being merged. These techniques may be particularly useful when several fault models are being merged.

After the smoothing step described above, and still at the box 40 of the flow chart diagram 30, domain knowledge can be applied in the form of subject matter expert review, to complete the merger and updating of the fault models 12 and 14 into the integrated fault model 22. The task of the subject matter expert is to consider the causality weight data which exists in the uncommon section 150 in the context of the common fault model 140, and decide how or whether to include it. In the case of the uncommon section 150, the subject matter expert must decide how to handle the causality weights 122 and 124. For example, the causality weight 122 could be directly included in the integrated fault model 22, it could be ignored entirely in the integrated fault model 22, or a value different than the causality weight 122 could be included in the integrated fault model 22. As shown on FIG. 6, the third option is chosen—that is, a new causality weight 162 is included in the integrated fault model 22, replacing the zero value in the common fault model 140. The value of the new causality weight 162 may be less than the value of the causality weight 122, reflecting the fact that the common fault model 140 had a zero value in this position. But this is not necessarily the case, and is at the discretion of the subject matter expert.

In the case of the causality weight 124, the subject matter expert decides it should not be included in the integrated fault model 22, and leaves the zero value in place from the common fault model 140. This completes the preparation of the integrated fault model 22. From this, a sub-graph 160 can be created, on which can be seen the causality weight 162.

While the graphs 80 and 120 shown in FIG. 5 contain all nodes in common, it is likely in real-world, complex fault models that this will not be the case. However, the case of uncommon nodes, that is, where a failure mode or a symptom appears in one fault model but not in another, is easily handled. In those cases, the nodes and causality weights can simply be carried forward to the uncommon section 150, and the subject matter expert can determine whether or not to include them in the integrated fault model 22.

Using the techniques described above, multiple fault models created from disparate data sources can be compared, merged, and updated, to produce the integrated fault model 22. At box 42 of the flow chart diagram 30, the integrated fault model 22 is used for any of a variety of purposes. As described previously, these purposes can include real-time fault diagnosis in an onboard computer in the vehicle 24, off-board fault diagnosis using the diagnostic tool 26, or use by the vehicle development personnel 28 for updating service documents or designing future vehicles, systems, or components.

The benefits of being able to compare, merge, and update multiple fault models are numerous. One significant benefit is the ability to detect inappropriate repairs which are being carried out at service shops. For example, if the service document fault model 14 and the warranty data fault model 18 are compared and merged using the integration module 20, it can become apparent if a symptom is being used to incorrectly diagnose a failure mode in field service facilities, such that inappropriate part repairs or replacements are being performed. This information can then be communicated to service facilities, highlighting the proper diagnosis for certain symptoms, and reducing the incidence of mis-diagnosis and inappropriate or unnecessary repair work. Also, when comparing field failure data in the warranty data fault model 18 with service procedures in the service document fault model 14, new failure modes and symptoms can readily be identified. This previously undocumented information can be used to update service procedure documents and improve future product designs, which represents another benefit of the disclosed methods.

Yet another benefit of the integrated fault model 22 is the ability to compare failure modes and symptoms across vehicle models, and learn how to improve future vehicle designs. One simple example of this would be to compare the warranty data fault model 18 for two or more vehicle models or platforms. The integration module 20 would identify which failure modes and symptoms are common between the vehicle platforms, and which are unique to one or another. This information can be used by the vehicle development personnel 28 to design future vehicles to take advantage of the most reliable features and sub-systems used in current models.

Finally, the methods disclosed herein make it possible to compare multiple fault models which are just too large and too dissimilar to compare through manual methods. The fault models which are developed for real vehicles and systems typically include hundreds of failure modes and symptoms, and possibly data beyond the two dimensions of failure modes and symptoms. This makes it impractical for a person to perform a detailed comparison of one fault model to another through visual inspection. Using the bipartite weighted graphing method for common fault model creation allows the subject matter expert to focus only on the uncommon elements between two or more fault models, while the majority of the data in the fault models is rationalized automatically. The integrated fault model 22 is a powerful document which can enable a vehicle manufacturer to increase customer satisfaction, reduce warranty costs, and improve future product designs.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for comparing and merging fault models, said method comprising:
    providing a first fault model and a second fault model, where the first and second fault models are derived from different data sources and describe failure modes and symptoms of a hardware or software system;
    representing the first fault model as a first bipartite weighted graph, and the second fault model as a second bipartite weighted graph;
    matching graph nodes between the bipartite weighted graphs, using a microprocessor, to identify common symptoms and failure modes;
    employing a graph matching technique to compare the bipartite weighted graphs and the fault models, and produce a common sub-graph and an uncommon section;
    applying parameter smoothing techniques and domain knowledge to the common sub-graph and the uncommon section to merge and update the fault models into an integrated fault model; and
    using the integrated fault model in connection with the hardware or software system.

2. The method of claim 1 wherein providing a first fault model and a second fault model includes providing fault models of types including an engineering data fault model, a service document fault model, a text verbatim fault model, and a warranty data fault model.

3. The method of claim 1 wherein representing the first fault model as a first bipartite weighted graph, and the second fault model as a second bipartite weighted graph includes creating a node for each of the failure modes and each of the symptoms, and connecting the nodes with arrows representing causality weights.

4. The method of claim 1 wherein matching graph nodes between the bipartite weighted graphs includes comparing each of the failure modes of the first fault model with each of the failure modes of the second fault model, and each of the symptoms of the first fault model with each of the symptoms of the second fault model to determine which of the failure modes and symptoms are the same.

5. The method of claim 1 wherein matching graph nodes between the bipartite weighted graphs includes removing superfluous words, resolving synonyms, acronyms, and abbreviations, applying text similarity measures to provide a text similarity score, and using the text similarity score to determine which of the failure modes and symptoms are the same.

6. The method of claim 1 wherein employing a graph matching technique to compare the bipartite weighted graphs and the fault models includes selecting for inclusion in the common sub-graph only correlations which have a non-zero value in both the first bipartite weighted graph and the second bipartite weighted graph, and placing in the uncommon section any correlations which have a non-zero value in only one of the first bipartite weighted graph or the second bipartite weighted graph.

7. The method of claim 1 wherein applying parameter smoothing techniques and domain knowledge to the common sub-graph and the uncommon section includes using Laplacian or Bayesian smoothing techniques.

8. The method of claim 1 wherein applying parameter smoothing techniques and domain knowledge to the common sub-graph and the uncommon section includes reviewing by a subject matter expert to determine how to incorporate content from the uncommon section into the integrated fault model.

9. The method of claim 1 wherein the hardware or software system is a vehicle or a vehicle sub-system.

10. The method of claim 9 wherein using the integrated fault model in connection with the hardware or software system includes using the integrated fault model in a processor onboard the vehicle, using the integrated fault model in a diagnostic tool at a service facility, or using the integrated fault model by vehicle development personnel to improve service procedures or design new products.

11. A method for comparing and merging fault models, said method comprising:
providing a first fault model and a second fault model, where the first and second fault models are derived from different data sources and describe failure modes and symptoms of a vehicle or a vehicle sub-system, and the fault models are of types including an engineering data fault model, a service document fault model, a text verbatim fault model, and a warranty data fault model;
representing the first fault model as a first bipartite weighted graph, and the second fault model as a second bipartite weighted graph;
matching graph nodes between the bipartite weighted graphs, using a microprocessor, to identify common symptoms and failure modes;
employing a graph matching technique to compare the bipartite weighted graphs and the fault models, and produce a common sub-graph and an uncommon section;
applying parameter smoothing techniques and domain knowledge to the common sub-graph and the uncommon section to merge and update the fault models into an integrated fault model; and
using the integrated fault model in connection with the vehicle or the vehicle sub-system.

12. The method of claim 11 wherein representing the first fault model as a first bipartite weighted graph, and the second fault model as a second bipartite weighted graph includes creating a node for each of the failure modes and each of the symptoms, and connecting the nodes with arrows representing causality weights.

13. The method of claim 11 wherein matching graph nodes between the bipartite weighted graphs includes removing superfluous words, resolving synonyms, acronyms, and abbreviations, applying text similarity measures to provide a text similarity score, and using the text similarity score to determine which of the failure modes and symptoms are the same.

14. The method of claim 11 wherein applying parameter smoothing techniques and domain knowledge to the common sub-graph and the uncommon section includes using Laplacian or Bayesian smoothing techniques, and reviewing by a subject matter expert to determine how to incorporate content from the uncommon section into the integrated fault model.

15. A system for comparing and merging fault models, said system comprising:
means for providing a first fault model and a second fault model, where the first and second fault models are derived from different data sources and describe failure modes and symptoms of a vehicle or a vehicle sub-system;
means for representing the first fault model as a first bipartite weighted graph, and the second fault model as a second bipartite weighted graph;
means for matching graph nodes between the bipartite weighted graphs to identify common symptoms and failure modes;
means for employing a graph matching technique to compare the bipartite weighted graphs and the fault models, and produce a common sub-graph and an uncommon section;
means for applying parameter smoothing techniques and domain knowledge to the common sub-graph and the uncommon section, to merge and update the fault models into an integrated fault model; and
means for using the integrated fault model in connection with the vehicle or the vehicle sub-system.

16. The system of claim 15 wherein the means for matching graph nodes between the bipartite weighted graphs compares each of the failure modes of the first fault model with each of the failure modes of the second fault model, and each of the symptoms of the first fault model with each of the symptoms of the second fault model, to determine which of the failure modes and symptoms are the same.

17. The system of claim 16 wherein the means for matching graph nodes between the bipartite weighted graphs removes superfluous words, resolves synonyms, acronyms, and abbreviations, applies text similarity measures to provide a text similarity score, and uses the text similarity score to determine which of the failure modes and symptoms are the same.

18. The system of claim 15 wherein the means for employing a graph matching technique to compare the bipartite weighted graphs and the fault models selects for inclusion in the common sub-graph only correlations which have a non-zero value in both the first bipartite weighted graph and the second bipartite weighted graph, and places in the uncommon section any correlations which have a non-zero value in only one of the first bipartite weighted graph or the second bipartite weighted graph.

19. The system of claim 15 wherein the means for applying parameter smoothing techniques and domain knowledge to the common sub-graph and the uncommon section uses Laplacian or Bayesian smoothing techniques and review by a subject matter expert to determine how to incorporate content from the uncommon section into the integrated fault model.

20. The system of claim 15 wherein the means for using the integrated fault model in connection with the vehicle or the vehicle sub-system uses the integrated fault model in a processor onboard the vehicle, uses the integrated fault model in a diagnostic tool at a service facility, or uses the integrated fault model by vehicle development personnel to improve service procedures or design new products.

* * * * *